(12) United States Patent
Hoffman et al.

(10) Patent No.: US 7,365,891 B2
(45) Date of Patent: *Apr. 29, 2008

(54) METHOD AND APPARATUS FOR DIRECTING ENERGY BASED RANGE DETECTION SENSORS

(75) Inventors: Eric Hoffman, Pittsburgh, PA (US); William Darin Ingimarson, Clairton, PA (US); Ryan M. Sullivan, Pittsburgh, PA (US)

(73) Assignee: Quantapoint, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/091,170

(22) Filed: Mar. 28, 2005

(65) Prior Publication Data

US 2005/0195459 A1    Sep. 8, 2005

Related U.S. Application Data

(63) Continuation of application No. 10/114,871, filed on Apr. 2, 2002, now Pat. No. 6,906,837, which is a continuation of application No. 09/435,755, filed on Nov. 8, 1999, now Pat. No. 6,373,612, which is a continuation of application No. 08/846,317, filed on Apr. 30, 1997, now Pat. No. 6,034,803.

(51) Int. Cl.
    *G02B 26/08*    (2006.01)
(52) U.S. Cl. .................. 359/196; 359/198; 359/212; 359/213; 359/226; 359/900; 356/601
(58) Field of Classification Search .............. None
    See application file for complete search history.

(56) References Cited

U.S. PATENT DOCUMENTS

| | | |
|---|---|---|
| 4,199,253 A | 4/1980 | Ross |
| 4,210,399 A | 7/1980 | Jain |
| 4,379,624 A | 4/1983 | Miller et al. |
| 4,387,297 A | 6/1983 | Swartz et al. |
| 4,429,210 A | 1/1984 | Sudo et al. |
| 4,641,972 A | 2/1987 | Halioua et al. |
| 4,838,631 A | 6/1989 | Chande et al. |
| 4,850,687 A | 7/1989 | Reis et al. |
| 4,971,410 A | 11/1990 | Wike, Jr. et al. |

(Continued)

FOREIGN PATENT DOCUMENTS

EP    0525500    5/1993

(Continued)

OTHER PUBLICATIONS

Acuity Research, Inc., AccuRange Line Scanner Technical Specifications, (1995).

(Continued)

*Primary Examiner*—James Phan
(74) *Attorney, Agent, or Firm*—Ansel M. Schwartz

(57) ABSTRACT

A directing apparatus includes a mechanism for producing steerable energy. The apparatus includes a mechanism for steering energy from the producing mechanism while the producing mechanism is stationary. The steering mechanism is in communication with the producing mechanism. The steering mechanism includes a scanning mechanism which continuously in a first direction scans the volume of a surrounding vertically and horizontally. A directing method.

24 Claims, 8 Drawing Sheets

U.S. PATENT DOCUMENTS

| | | | |
|---|---|---|---|
| 5,100,229 A | 3/1992 | Lundberg et al. | |
| 5,130,838 A | 7/1992 | Tanaka et al. | |
| 5,132,524 A | 7/1992 | Singh et al. | |
| 5,146,463 A | 9/1992 | Rando | |
| 5,187,612 A | 2/1993 | Plesko | |
| 5,210,634 A | 5/1993 | Iwama | |
| 5,258,822 A | 11/1993 | Nakamura et al. | |
| 5,272,353 A | 12/1993 | Barkan et al. | |
| 5,280,378 A | 1/1994 | Lombardo | |
| 5,339,188 A | 8/1994 | Fritzel | |
| 5,371,347 A | 12/1994 | Plesko | |
| 5,543,954 A | 8/1996 | Nicholson | |
| 5,546,217 A | 8/1996 | Greenway | |
| 5,555,125 A | 9/1996 | Peng | |
| 5,583,685 A | 12/1996 | Ohtomo et al. | |
| 5,617,241 A * | 4/1997 | Kitazawa | 359/200 |
| 5,694,235 A * | 12/1997 | Kajiki | 359/202 |
| 5,793,491 A * | 8/1998 | Wangler et al. | 356/613 |
| 5,988,862 A | 11/1999 | Kacyra et al. | |
| 6,034,803 A | 3/2000 | Sullivan et al. | |
| 6,330,523 B1 | 12/2001 | Kacyra et al. | |
| 6,373,612 B1 | 4/2002 | Hoffman et al. | |
| 6,906,837 B2 | 6/2005 | Hoffman et al. | |

FOREIGN PATENT DOCUMENTS

| | | |
|---|---|---|
| JP | S50-29544 | 9/1976 |
| JP | 54-56472 | 5/1979 |
| JP | 60-012527 | 1/1985 |
| JP | S61-99116 | 5/1986 |
| JP | S61-78044 | 11/1987 |
| JP | H3-162338 | 12/1992 |

OTHER PUBLICATIONS

Acuity Research, Inc., "Using the AccuRange 4000," p. 1-5, (Jun. 4, 1995).
Acuity Research, Inc., U.S. Price List—Effective Jul. 1996.
Acuity Research, Inc., AccuRange 3000 Sensor Advertisement, Sensors, p. 29, (Oct. 1994).
Acuity Research, Inc., AR4000 Laser Distance Sensor Advertisement, (1995).
DeltaSphere-3000 Laser 3D Scene Digitizer, 3rdTech Advertising Literature, 2000.
Thorpe, C.; Kanade, T., "First Year End Report for Perception for Outdoor Navigation," Technical Report, Carnegie Mellon University, CMU-RI-TR-90-23, (1990).
Herbert, M.; Krotkov, E.; Kanade, T., "A Perception System for a Planetary Explorer," Proc. of IEEE Conf. on Decision and Control (Tampa, FL), p. 1151-1155, (1989).
Herbert, M.; Kanade, T.; Kweon, S.J., "3-D Vision Techniques for Autonomous Vehicles," Analysis and Interpretation of Range Images, Springer Verlag Berlin (1990).
Rozmann, M.; Detlefsen, J., "Environmental Exploration Based on a Three-Dimensional Imaging Radar Sensor," Proceedings of the 1992 IEEE/RSJ International Conference on Intelligent Robots and Systems (Raleigh, NC), (Jul. 7-10, 1992).
Lange, M.; Detlefsen, J., "94 GHz 3-D-Imaging Radar for Sensorbased Locomotion," Proc. International Microwave Symposium IEEE MTT-S (Long Beach), p. 1091-1094, (1989).
Lange, M.; Detlefsen, J, "94 GHz 3-D-Imaging Radar Sensor for Autonomous Vehicles," IEEE Transactions on Microwave Theory and Techniques, vol. 39 ( No. 5), (1991).
Frohlich, C.; Mettenleiter, M.; Schmidt, G.; Novak, K., "Integration of an Imaging Laser in Mobile Mapping Systems," (1995).
Langer, D., Mettenleiter, M.; Haertl, F.; Frohlich, C., "Imaging Laser Scanners for 3-D Modeling and Surveying Applications," Proceedings of the 2000 IEEE International Conference on Robotics and Automation (San Francisco, CA), (Apr. 2000).
Arras, K.; Persson, J.; Tomatis, N.; Siegwart, R., "Real-Time Obstacle Avoidance for Polygonal Robots with a Reduced Dynamic Window," Proc. of the 2002 IEEE International Conference on Robotics and Automation (Washington, D.C.), p. 3050-3055, (May 2002).
Bengtsson, O.; Baerveldt, A., "Matching of Laser Range-Finder Scans in Changing Enviromnents," M2VIP 99 (Ankara, Turkey), p. 103-109, (1999).
Borenstein, J.; Everett, H.R.; Feng, L., "SEO LRF-200 OEM Laser Rangefinders," Where Am I? Sensors and Methods for Mobile Robot Positioning, University of Michigan, p. 101-102, (Apr. 1996).
Borenstein, J.; Everett, H.R.; Feng, L., "RIEGL LD90-3 Laser Rangefinder and LRS90-3 Scanning Laser Rangefinder," Where am I? Sensors and Methods for Mobile Robot Positioning, University of Michigan, p. 107-109, (Apr. 1996).
Frohlich, C.; Mettenleiter, M.; Haertl, F., "Imaging Laser Radar for High-Speed Monitoring of the Environment ," (1998).
Borenstein, J.; Everett, H.R.; Feng, L., "RVSI Long Optical Ranging and Detection System," Where am I? Sensors and Methods for Mobile Robot Positioning, University of Michigan, p. 109-111, (Apr. 1996).
Borenstein, J.; Everett, H.R.; Feng, L., "SEO Scanning Helicopter Interference Envelope Laser Detector (SHIELD), SEO TreeSense, SEO AutoSense," Where am I? Sensors and Methods for Mobile Robot Positioning, University of Michigan, p. 103-106, (Apr. 1996).
Borenstein, J.; Everett, H.R.; Feng, L., "Odetics Scanning Laser Imaging System," Where am I? Sensors and Methods for Mobile Robot Positioning, University of Michigan, p. 115-116, (Apr. 1996).
Borenstein, J.; Everett, H.R.; Feng, L., "ESP Optical Ranging System," Where am I? Sensors and Methods for Mobile Robot Positioning, University of Michigan, p. 116-117, (Apr. 1996).
Borenstein, J.; Everett, H.R.; Feng, L., "Acuity Research AccuRange 3000," Where am I? Sensors and Methods for Mobile Robot Positioning, University of Michigan, p. 117-118, (Apr. 1996).
Everett, H.R., "TRC Light Direction and Ranging System," Sensors for Mobile Robots: Theory and Application, University of Michigan, p. 187-188, (1995).
Mensi, Inc. GS100 Long Range Scanner brochure, 2003.
Trimble, Inc. GS200 3D Laser Scanner Product brochure, 2004.
Frohlich, C., "Aktive Erzeugung korrespondierender Tiefenund Reflektivitatsbilder und ihre Nutzung zur Umgebungserfassung," Pro Universitate Verlag, (1996).
Herman, H.; Singh, S., "First Results in the Autonomous Retrieval of Buried Object," Proc. of International Conference on Robotics and Automation (San Diego), (May 1994).
Riegl USA, LMS-Z360i brochure, 2003.
Borenstein, J.; Everett, H.R.; Feng, L., "Swiss Federal Institute of Technology's 3-D Imaging Scanner," Navigating Mobile Robots: Systems and Techniques, AK Peters Ltd. (Wellesley, MA), p. 90-91, (1996).
Kwon, Y.; Lee, J., "A Stochastic Environment Modeling Method for Mobile Robot by Using 2-D Laser Scanner," Department of Electrical Engineering, Pohang University of Science and Technology, (1997).
Wettergreen, David; Thorpe, Chuck; Whittaker, Red, "Exploring Mount Erebus by Walking Robot," Robotics and Autonomous Systems, (1993).
Gonzalez, J.; Ollero, A.; Reina, A., "Map Building for a Mobile Robot Equipped with a 2D Laser Rangefinder," IEEE, (1994).
El-Hakim, S.; Beraldin, J.; Balis, F., "A Comparative Evaluation of the Performance of Passive and Active 3-D Vision Systems," SPIE, vol. 2646, (1995).
Laurin, D.; Blais, F.; Beraldin, J.; Cournoyer, L., "An Eye-Safe Imaging and Tracking Laser Scanner System for Space Applications," SPIE, vol. 2748, p. 168-177, (1996).
Rioux, M.; Beraldin, A.; Godin, G.; Blais, F.; Cournoyer, L., "High Resolution Digital 3-D Imaging of Large Structures," SPIE, vol. 3023, p. 109-118, (1997).
Beraldin, J.; Blais, F.; Rioux, M.; Cournoyer, L.; Laurin, D.; Maclean, S., "Short and Medium Range 3-D Sensing for Space Applications," SPIE, vol. 3074, p. 29-46, (1997).
CLR Photonics, Wind Tracer product brochure, 2003.
Wissler, R.; Frohlich, C., "3D Imaging Laser Scanner for the Inspection of Tunnels," SPIE vol. 2249 Automated 3D and 2D Vision, p. 96-106, (1994).

Whittaker, W.; Kanade, T.; Mitchell, T., "1990 Year End Report Autonomous Planetary Rover at Carnegie Mellon," CMU-RI-TR-91-19, p. 1-5,28,40-41, (Aug. 1991).
Singh, S.; West, J., "Cyclone: A Laser Scanner for Mobile Robot Navigation," CMU-RI-TR-91-18, (1991).
Gonzalez, J.; Stentz, A.; Ollero, A., "An Iconic Position Estimator for a 2D Laser RangeFinder," CMU-RI-TR-91-18, (1991).
Krotkov, E., "Laser Rangefinder Calibration for a Walking Robot," CMU-RI-TR-90-30, (1990).
Hebert, M.; Kanade, T.; Kweon, I., "3-D Vision Techniques for Autonomous Vehicles," CMU-RI-TR-88-12, (1988).
Henriksen, L., "Laser Ranger Based Hazard Detection," CMU-RI-TR-96-32, (1996).
Kweon, I.; Hoffman, R.; Krotkov, E., "Experimental Characterization of the Perceptron Laser Rangefinder," CMU-RI-TR-91-1, p. 1-6, (Jan. 1991).
Kelly, A., "Concept Design of a Scanning Laser Rangefinder for Autonomous Vehicles," CMU-RI-TR-94-21, p. 1-3, 37-44, (1995).
Langer, D., "An Integrated MMW Radar System for Outdoor Navigation," The Robotics Institute, Carnegie Mellon University, p. 1-20, (Jan. 1997).
Kanade, T.; Asada, H., "Noncontact Visual Three-Dimensional Ranging Devices," Proc. SPIE, 3-D Machine Perception, vol. 283 (Washington, D.C.), p. 48-53, (Apr. 1981).
Hebert, M.; Kanade, T., "3-D Vision for Outdoor Navigation by an Autonomous Vehicle," Proc. of Image Understanding Workshop, Morgan Kaufmann Publishing, p. 593-601, (Apr. 1988).
Hebert, M.; Kanade, T., "Outdoor Scene Analysis Using Range Data," Proc. IEEE International Conference on Robotics and Automation, p. 1426-1432, (Apr. 1986).
Horn, B.; Harris, J., "Rigid Body Motion from Range Image Sequences," MIT AI Laboratory, Technical Paper (Cambridge, MA), p. 1-12, (1989).
Eck, M.; Hoppe, H., "Automatic Reconstruction of B-Spline Surfaces of Arbitrary Topological Type," Microsoft Research, (1996).
Hebert, M.; Krotkov, E., "3D Measurements from Imaging Laser Radars: How Good Are They?," Image and Vision Computing, vol. 10 (No. 3), (Apr. 1992).
Hebert, M.; Caillas, C.; Krotkov, E.; Kweon, I.; Kanade, T., "Terrain Mapping for a Roving Planetary Explorer," IEEE CH2750, p. 997-1002, (Aug. 1989).
Hebert, M.; Krotkov, E., "3D Measurements from Imaging Laser Radars: How Good Are They?," IEEE/RSJ Int. Workshop on Intelligent Robots and Systems IROS (Osaka, Japan), p. 359-364, (Nov. 1991).
Brooks, R.; Connell, J.; Ning, P., "Herbert: A Second Generation Mobile Robot," MIT A.I. Memo 1016, (Jan. 1988).
LightRanger Brochure, Aug. 1997.
Gustavson, R.; Olson, R., "Laser-Based Vehicle Detector/Classifier," IVHS-IDEA Project 6, p. 29-30, (Sep. 1994).
Everett, H.R., "SEO Hover Obstacle Proximity Sensor System", Sensors for Mobile Robots: Theory and Application, University of Michigan, 1995, p. 152-153.
Carnegie Mellon University, Fall 1996 course notes regarding Cyclone Laser Scanner, p. 13, 9 (1996).
Nyland, L., "Capturing Dense Environmental Range Information with a Panning, Scanning Laser Rangefinder", IEEE Proc. (1998).
Note of Lars Nyland detailing research timeline for UNC Line-Scanning Laser Rangefinder Development (1998).
MetricVision Brochure, Metric Vision, Inc. (2001).
Clark, R.B.; Gallman, P.G.; Slotwinski, A.R.; Wagner, K.; Weaver, S.; Xu, J., "Fiber Optic Coherent Laser Radar 3D Vision System", Industry Partnerships to Deploy Environmental Technology, Report # DOE/MC/31190-97/C0818, Coleman Research Corporation (Oct. 1996).
White, D., "Coherent Laser Radar: True Noncontact 3-D Measurement Has Arrived," Quality Digest Online, (1999).
Barry, R.; Burgess, T.; Menon, M.; Slotwinski, A.; Sebastian, R., "A Coherent FM Laser Radar Based System for Remote Metrology in ITER," Proc. SOFE, University of Illinois, (Oct. 1995).
Coherent Laser Vision System (CLVS) Technology Development Data Sheet, Federal Energy Technology Center, p. 143-144 (Oct. 1997).
Three Dimensional Integrated Characterization and Archiving System (3D-ICAS), Federal Energy Technology Center, p. 145-146 (Oct. 1997).
Thorpe, C.; Hebert, M.; Kanade, T.; Shafer, S., "Vision and Navigation for the Carnegie-Mellon Navlab," IEEE Transactions on Pattern Analysis and Machine Intelligence, vol. 10 (No. 3), (May 1988).
Besl, P., "3-D Range Imaging Sensors," Technical Report GMR-6090, General Motors Research Lab (Warren, MI), (1988).
Kaisto, I.; Kostamovaara, J.; Manninen, M.; Myllyla, R., "Laser Radar Based Measuring Systems For Large Scale Assembly Applications," SPIE vol. 2088, (1994).
Lamb, D.; Baird, D.; Greenspan, M., "An Automation System for Industrial 3-D Laser Digitizing," IEEE, paper describing the RapidScan system funded under the Canadian Space Agency STEAR program, (1988).
Thorpe, C., "Vision and Navigation," Kluwer Academic Publishers, Chapter 7—Building and Navigating Maps of Road Scenes Using Active Range and Reflectance Data, p. 116-121, (1990).
Thorpe, C., "Vision and Navigation," Kluwer Academic Publishers, Chapter 8—3-D Vision Techniques for Autonomous Vehicles, p. 131-135, (1990).
Arras, K.; Tomatis, N.; Siegwart, R., "Multisensor On-the-Fly Localization Using Laser and Vision," Proc. of the 2000 IEEE/RSJ Int. Conference on Intelligent Robots and Systems, (2000).
Gomes-Mota, J.; Ribeiro, M., "A Multi-Layer Mobile Robot Localization Solution Using a Laser Scanner on Reconstructed 3D Models," Instituto Superior Tecnico/Instituto de Sistemas e Robotica (Libson, Portugal), (1988).
Pito, R., "Characterization, Calibration, and Use of the Perceptron Laser Range Finder in a Controlled Environment," MS-CIS-95-05, Department of Computer and Information Science, University of Pennsylvania (Philadelphia, PA), p. 1-10, (1995).
Stone, W.; Juberts, M.; Dagalakis, N.; Stone, J.; Gorman, J., "Coherent Technologies, Inc.," Performance Analysis of Next-Generation LADAR for Manufacturing, Construction, and Mobility, NISTIR 7117 (Gaithersburg, MD), p. 6.5-6.9, (2004).
Attachement 1.
C. Frohlich and G. Schmidt, "Laser Range Scanner Supporting 3-D Range and 2-D Grey Level Images for Tunnel Surface Inspection," Technical University of Munich, Germany, (Jun. 10, 1994).
Richard Pito, "Characterization, Calibration, and Use of the Perceptron Laser Range Finder in a Controlled Environment," Grasp Laboratory, University of Pennsylvania (Philadelphia, PA), p. 1-24, (Jan. 26, 1995).
Jay West, John Bares, "Spherical Laser Scanner for Mobile Robot Applications," NASA Space Telerobotics Program, http://ranier.oact.hq.nasa.gov/telerobotics_page/Technologies/0241.html (Pittsburgh, PA), p. 1-2, (Nov. 10, 1996).

* cited by examiner

US 7,365,891 B2

METHOD AND APPARATUS FOR DIRECTING ENERGY BASED RANGE DETECTION SENSORS

This application is a continuation of applications
Application Ser. No. 10/114,871 filed on Apr. 2, 2002 now U.S. Pat. No. 6,906,837.
Application Ser. No. 09/435,755 filed on Nov. 8, 1999 now U.S. Pat. No. 6,373,612.
Application Ser. No. 08/846,317 filed on Apr. 30, 1997 now U.S. Pat. No. 6,034,803.

FIELD OF THE INVENTION

The present invention is related to steering and scanning mechanisms. More specifically, the present invention is related to a scanning mechanism having an unobstructed view, operates continuously in one direction and can operate in any orientation.

BACKGROUND OF THE INVENTION

The ability to measure surfaces and objects in 3-D is becoming increasingly important for many fields such as autonomous vehicle navigation and obstacle detection, quarry mapping, landfill surveying, and hazardous environment surveying. The current state of the art for scanning mechanisms is unable to meet the demand of many of these applications. Typical scanners are slow, unable to measure with an unobstructed view and inflexible in their ability to use different types of range sensors. The present invention overcomes these limitations and provides a system that will meet the existing demand for more advanced scanning mechanisms.

SUMMARY OF THE INVENTION

The present invention pertains to a directing apparatus. The directing apparatus comprises a mechanism for producing steerable energy. The directing apparatus also comprises a mechanism for steering energy from the producing mechanism. The steering mechanism is in communication with the producing mechanism.

The present invention pertains to a directing apparatus. The directing apparatus comprises a mechanism for producing steerable energy. The directing apparatus also comprises a mechanism for scanning steerable energy from the producing mechanism. The scanning mechanism is in communication with the producing mechanism and operable in any orientation.

The present invention pertains to a directing apparatus. The directing apparatus comprises a mechanism for producing steerable energy. The directing apparatus also comprises a mechanism for scanning steerable energy from the producing mechanism. The scanning mechanism is in communication with the producing mechanism and performing a line scan at a given adjustable angle.

The present invention pertains to a directing apparatus. The directing apparatus comprises a mechanism for producing steerable energy. The directing apparatus also comprises a mechanism for scanning steerable energy from the producing mechanism. The scanning mechanism is in communication with the producing mechanism and able to be stopped at a first location and at least a second location so the energy can be secured in a constant direction at each location for as long as desired.

The present invention pertains to a directing apparatus. The directing apparatus comprises a mechanism for producing steerable energy. The directing apparatus also comprises a mechanism for scanning steerable energy from the producing mechanism. The scanning mechanism is in communication with the producing mechanism and rotatable 360 degrees without any obstructions from the apparatus itself to the steerable energy that is used to scan the surrounding.

The present invention pertains to a directing apparatus. The directing apparatus comprises a mechanism for producing steerable energy. The directing apparatus also comprises a mechanism for scanning steerable energy from the producing mechanism. The scanning mechanism is in communication with the producing mechanism and having an adjustable nod angle between a first predetermined angle and a second predetermined angle.

The present invention pertains to a directing method. The directing method comprises the steps of producing steerable energy. Next there is the step of scanning a surrounding continuously in a first direction with the steerable energy.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 4:
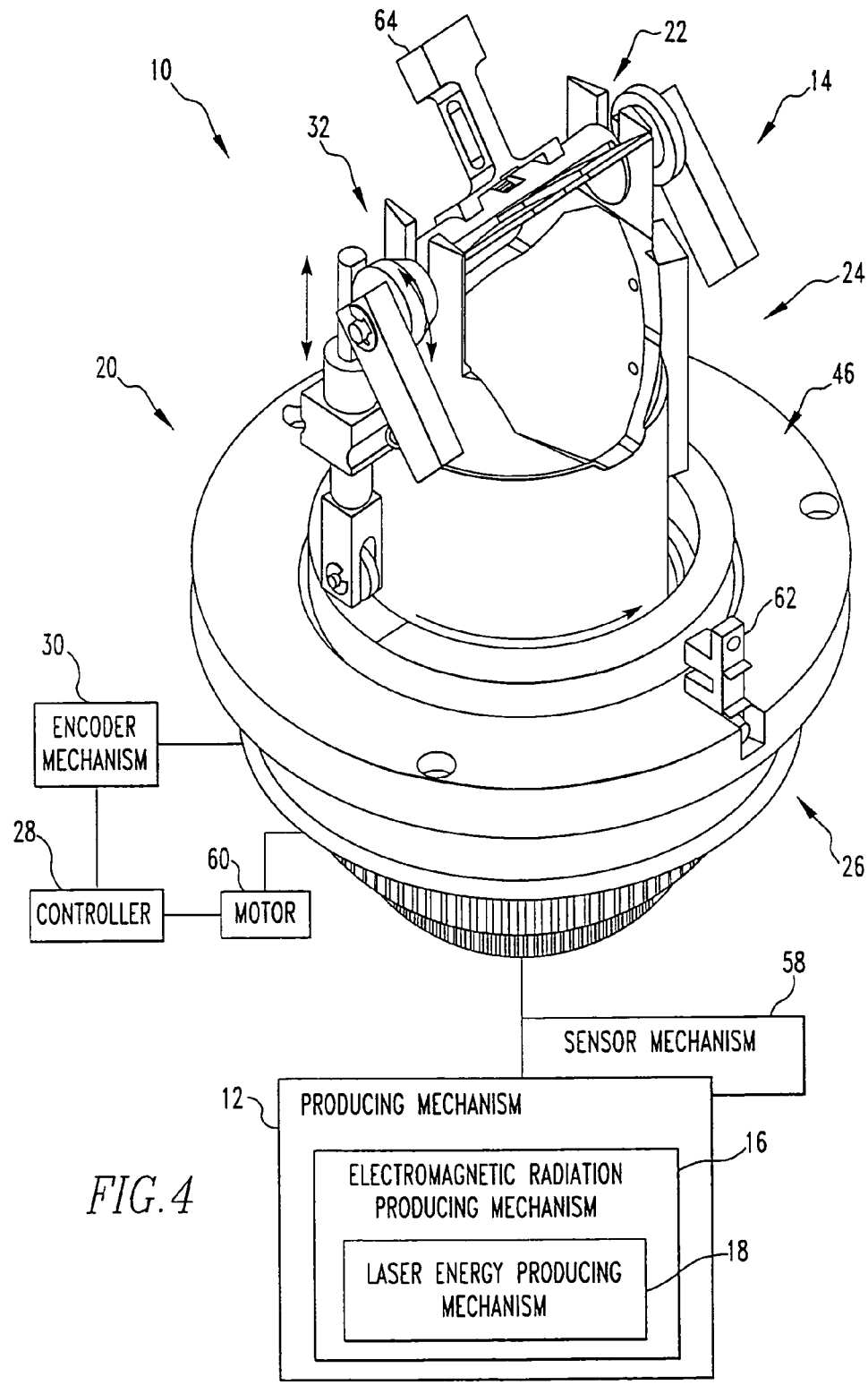
FIG. 4 is an isometric view of the mechanism showing the direction of rotation and translations of the components in the invention according to its first embodiment.

Referring now to the drawings wherein like reference numerals refer to similar or identical parts throughout the several views, and more specifically to FIG. 4 thereof, there is shown a directing apparatus 10. The directing apparatus 10 comprises a mechanism 12 for producing steerable energy. The directing apparatus 10 also comprises a mechanism for steering energy from the producing mechanism 12. The steering mechanism 14 is in communication with the producing mechanism 12.

The mechanism for producing steerable energy preferably includes a mechanism 16 for producing electromagnetic radiation. The electromagnetic radiation producing mechanism 16 preferably includes a mechanism 18 for producing laser energy.

The steering mechanism 14 preferably includes a scanning mechanism 20 which continuously scans a surrounding in a first direction. Preferably the scanning mechanism 20 continually scans in the first direction at a speed which is adjustable. Preferably the scanning mechanism 20 continually scans in the first direction at a speed which is adjustable between 10-4000 rpm. The scanning mechanism 20 preferably includes a sensor mechanism 58 which receives electromagnetic radiation, such as the laser energy, back from the surrounding and determines how the surrounding looks from the energy.

The scanning mechanism 20 preferably includes a guide mechanism 22 which guides the radiation. The guide mechanism 22 preferably has a nod rate which is adjustable. The guide mechanism 22 preferably has a nod rate which is adjustable from 0.01-8 Hz.

The scanning mechanism 20 preferably includes a yoke assembly 24 which holds the guide mechanism 22. Preferably the scanning mechanism 20 includes a spindle assembly 26 upon which the yoke assembly 24 is mounted and which rotates continuously in the first direction. The scanning mechanism 20 preferably includes a controller 28 which regulates the spindle assembly 26. Additionally, the scanning mechanism 20 preferably includes an encoder mechanism 30 which measures the angular position of the spindle assembly 26. Preferably the scanning mechanism 20 includes a cam mechanism 32 connected to the guide mechanism 22 and the spindle mechanism which moves the guide mechanism 22 in a second direction perpendicular to the first direction.

Figure 7:
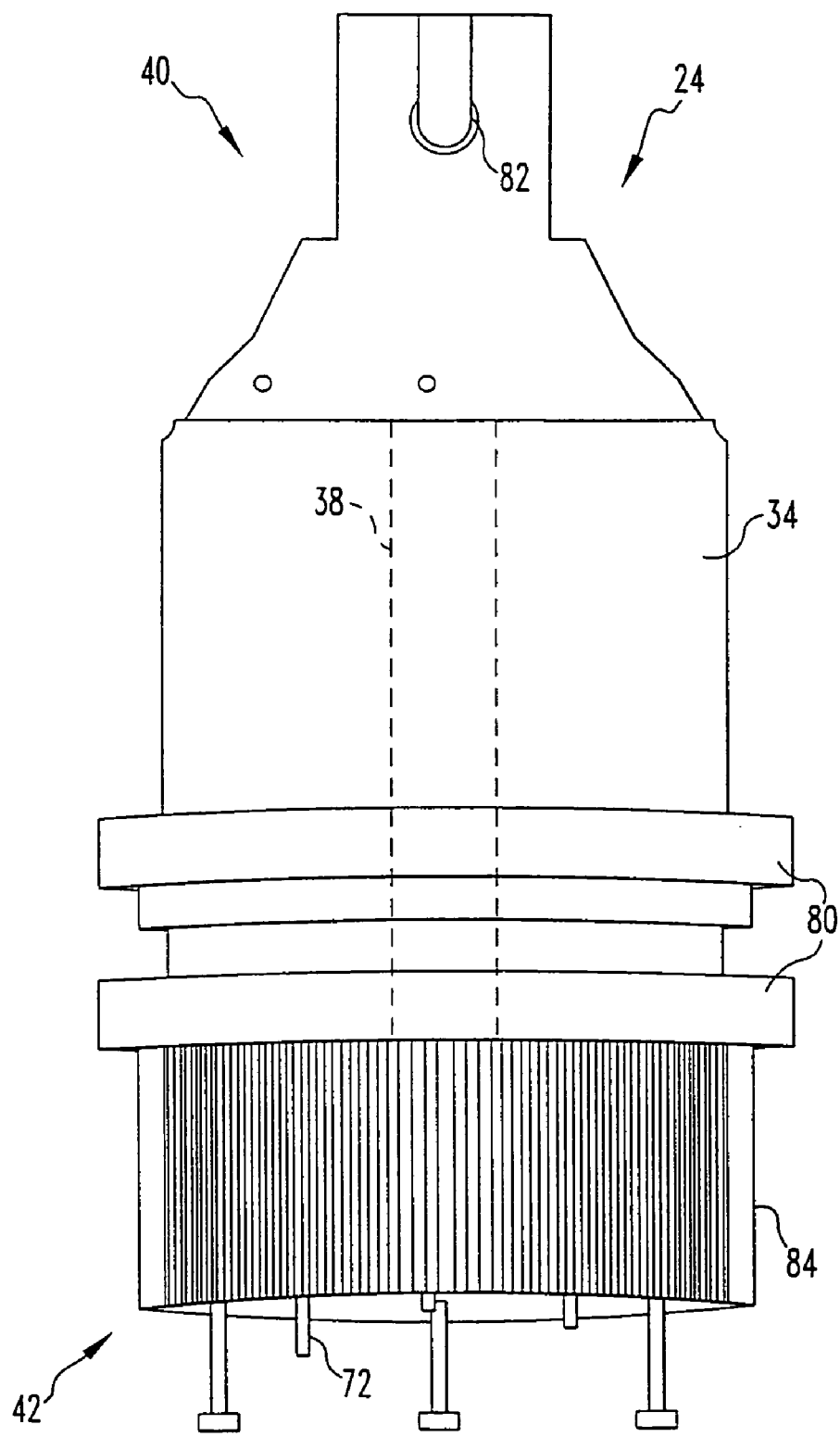
FIG. 7 is a schematic representation of a yoke assembly.
Figure 8:
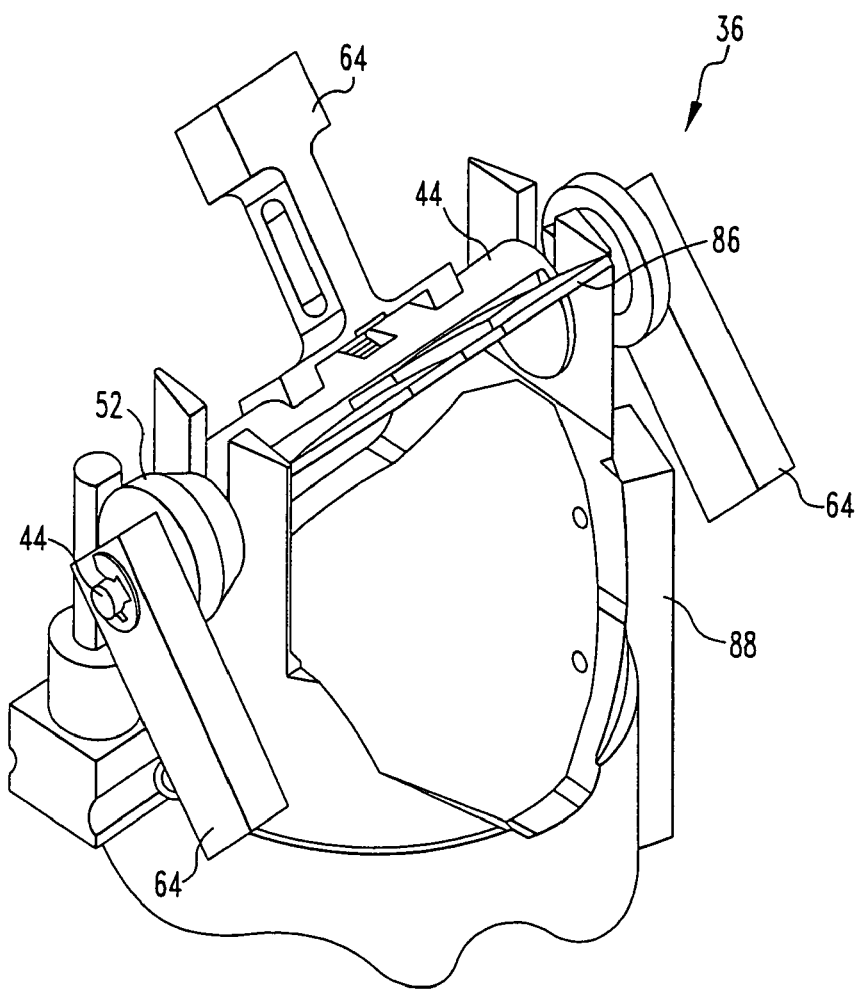
FIG. 8 is a schematic representation of a mirror assembly.

The guide mechanism 22 preferably includes a mirror assembly 36, as shown in FIG. 8. The yoke assembly 24 preferably includes a yoke 34 having a top 40 and a bottom 42 and an optical bore 38 for the electromagnetic radiation, such as the laser energy, to travel through the yoke 34, as shown in FIG. 7. The optical bore 38 is in alignment with the mirror assembly 36. Furthermore, the mirror assembly 36 preferably includes an axle 44 which connects the mirror assembly 36 to the yoke 34 and which is housed at the top 40 of the yoke 34. The laser energy producing mechanism 18 is preferably disposed at the bottom 42 of the yoke 34 and in alignment with the optical bore 38 so laser energy from the laser energy producing mechanism 18 can transmit along the optical bore 38 and be reflected by the mirror assembly 36.

The scanning mechanism 20 preferably includes a speed differential ring mechanism 46 bearinged coaxially with the yoke 34 and which rotates. The cam mechanism 32 moves along the speed differential ring mechanism 46 which causes the mirror assembly 36 to rotate in the second direction as a function of the relative difference in rotational speed between the speed differential ring mechanism 46 and the spindle assembly 26. Preferably the speed differential ring mechanism 46 has a vertical surface having a shape of a triangular wave pattern.

Figure 5:
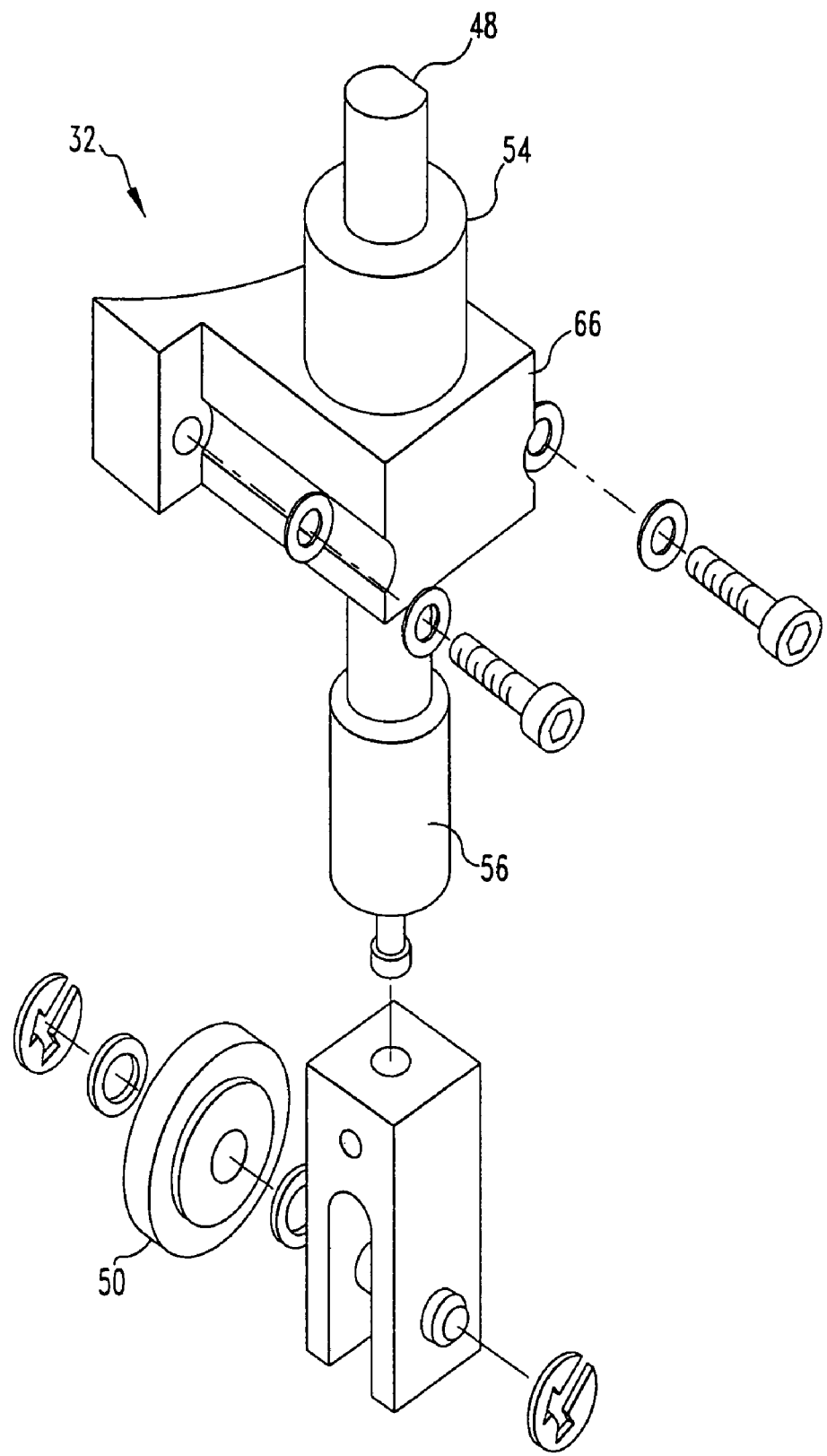
FIG. 5 is a schematic representation of a cam mechanism.

The cam mechanism 32, as shown in FIG. 5, is preferably comprised of a cam follower wheel 50 which moves along and tracks the vertical surface of the speed differential ring mechanism 46. The cam mechanism 32 is also comprised of the toothed rack 48 which is attached to the cam follower wheel 50. The cam mechanism 32 is comprised of a linear bearing 54 which houses the toothed rack 48. Preferably the guide mechanism 22 includes a spur gear 52 mounted coaxially on each end of the axle 44. The spur gear 52 meshes with the toothed rack 48 which actuates the axle 44 to move the mirror assembly 36 in the second direction as a function also of the gear tooth ratio between the toothed rack 48 and the spur gear 52. The cam mechanism 32 preferably also comprises a spring mechanism 56 disposed between and connected with the cam wheel 50 follower and the toothed rack 48 which allows the mirror assembly 36 to reduce backlash of the mirror assembly 36 and maintain the mirror assembly 36 in a stable configuration during rotation.

The mirror assembly 36 preferably has a weight distribution which is loaded to tip it backwards to keep the cam wheel 50 follower on the speed differential ring mechanism 46 as the mirror assembly 36 rotates by centrifugal force which is a function of the rotational speed of the mirror assembly 36.

The present invention pertains to a directing apparatus 10. The directing apparatus 10 comprises a mechanism for producing steerable energy. The directing apparatus 10 also comprises a mechanism for scanning steerable energy from the producing mechanism 12. The scanning mechanism 20 is in communication with the producing mechanism 12 and operable in any orientation.

The present invention pertains to a directing apparatus 10. The directing apparatus 10 comprises a mechanism for producing steerable energy. The directing apparatus 10 also comprises a mechanism for scanning steerable energy from the producing mechanism 12. The scanning mechanism 20 is in communication with the producing mechanism 12 and performs a line scan at a given adjustable angle. The line scan can be accomplished, for instance, by having the motor mechanism move the mirror mechanism to a desired location, or using windowing techniques, as is well known in the art.

The present invention pertains to a directing apparatus 10. The directing apparatus 10 comprises a mechanism for producing steerable energy. The directing apparatus 10 also comprises a mechanism for scanning steerable energy from the producing mechanism 12. The scanning mechanism 20 is in communication with the producing mechanism 12 and able to be stopped at a first location and at least a second location so the energy can be secured in a constant direction at each location for as long as desired. This can be accomplished, for instance, by controlling the motor mechanism so the mirror mechanism is held at the desired locations.

The present invention pertains to a directing apparatus 10. The directing apparatus 10 comprises a mechanism for producing steerable energy. The directing apparatus 10 also comprises a mechanism for scanning steerable energy from the producing mechanism 12. The scanning mechanism 20 is in communication with the producing mechanism 12 and rotatable 360 degrees without any obstructions from the apparatus itself to the steerable energy that is used to scan the surrounding.

The present invention pertains to a directing apparatus 10. The directing apparatus 10 comprises a mechanism for producing steerable energy. The directing apparatus 10 also comprises a mechanism 14 for scanning steerable energy from the producing mechanism 12. The scanning mechanism 20 is in communication with the producing mechanism 12 and having an adjustable nod angle between a first predetermined angle and a second predetermined angle.

The present invention pertains to a directing method. The directing method comprises the steps of producing steerable energy. Next there is the step of scanning a surrounding continuously in a first direction with the steerable energy.

Preferably, the scanning step includes the step of rotating a guide mechanism 22 from a mirror assembly 36 continuously in the first direction. Next there is the step of reflecting the energy into the surrounding with the mirror assembly 36 as the mirror assembly 36 rotates. Then there is the step of receiving the energy back at the mirror assembly 36 from the surrounding. Then there is the step of reflecting the energy with the mirror assembly 36 to a sensor mechanism 58. Next there is the step of determining how the surrounding looks from the energy received at the sensor mechanism 58.

The rotating step preferably includes the steps of rotating a spindle assembly 26 in the first direction upon which a yoke assembly 24 that holds the mirror assembly 36 is mounted. Then there is the step of rotating a speed differential mechanism bearing coaxially with the yoke assembly 24 and along which a cam mechanism 32 connected to the guide mechanism 22 moves to cause the mirror assembly 36 to rotate in a second direction as a function of the relative difference in rotational speed between the speed differential ring mechanism 46 and the spindle assembly 26.

In the operation of the preferred embodiment, there is shown in FIGS. 4, 5, 6, 7 and 8, a two-dimensional scanning mechanism 20 which is used to steer energy from lasers of a laser producing mechanism 18 to range detection sensors of a sensor mechanism 58 in order to generate range data from the entire surroundings of the scanning mechanism 20. The scanning mechanism 20 is comprised of a guide mechanism 22 having a gold coated aluminum mirror of mirror assembly 36, a yoke assembly 24 which allows the mirror assembly 36 to pivot vertically, a spindle assembly 26 which rotates the yoke assembly 24 horizontally, a speed differential ring mechanism 36 which generates the vertical scan motion, two brushless DC motors 60, two incremental encoders of an encoder mechanism 30, two optical switches 62, electronic circuits to control the motor velocities, electronic circuits to establish the position of the mirror assembly 36 in space, electronic circuits to collect and store range data, a mechanical housing used to mount a range detection sensor of sensor mechanism 58, and a commercially available range detection device, currently a Riegl laser spot sensor and an Amplitude Modulated Continuous Wave (AMCW) laser range finder from Z&F Inc. of sensor mechanism 58. Essentially, any laser range finder which produces energy which fits through the optical bore can be used.

The Riegl laser spot sensor uses a laser diode and a set of lenses to generate a collimated pulse of infrared laser energy. This beam of energy travels away from the sensor until it comes in contact with a surface or object. The energy reflects off of the object and a receiver in the sensor detects the reflected energy. By measuring the time elapsed between the beginning of the pulse and the return of the reflected energy to the receiver, the distance to the object can be calculated by using the speed of light as a constant.

The Z&F AMCW laser sensor modulates the amplitude of a two continuous beams of laser light generated by two laser diodes. There are two diodes used to improve the performance of the system over the large range of operation. The receiver in the sensor detects the light reflected from the environment and calculates the time of flight by matching the return wave form to the output modulation. This is then used to calculate the distance to the object.

In order to generate range from many discrete points in a volume surrounding the sensor, the laser energy must be steered to each point in the volume of interest.

A gold plated aluminum mirror is used to direct the energy pulse/beam. The laser reflects off of the mirror surface at the same angle it hits the mirror. Even though the mirror assembly 36 having the mirror is continuously moving, the reflected light is still received by the mirror due to the fact that the laser energy travels at the speed of light. This makes the change in mirror position negligible and allows the sensor's receiver to collect the reflected energy. The limit on a range finders speed is generally derived by processing time as apposed to time of flight of the laser energy.

The mirror is attached to an axle 44 which is then housed in a yoke 34 on bearings so that the mirror can rotate in the vertical axis. The mirror assembly 36 includes precisely machined counterweights 64 to dynamically balance the mirror vertical axis.

The yoke 34 is connected to a bearinged spindle assembly 26 which rotates in the horizontal axis. The spindle assembly 26 contains a spindle pulley which is connected to a brushless DC spindle motor 60 with a belt.

The spindle motor 60 speed is regulated using a commercially available motor control electronic circuit which implements a feedback loop using a hall-effect sensor mounted internally to the motor.

An incremental encoder of the encoder mechanism 30 is attached to the spindle motor 60 to measure the angular position of the spindle assembly 26 with respect to an index point. The index point is determined by using an optical switch 62 as is well known in the art. The absolute azithumis angle of the scanning mechanism 20 is determined by the following equation:

$$\Theta yph = Ny \times Sy - \text{offset}$$

$$Sy = \frac{360}{1000 \times 4 \times GRy}$$

Where:
$\Theta yph$=azimuth of the Yoke
Ny=Yoke encoder reading in counts
Sy=degrees/count
GRy=Gear Ratio on Yoke
Offset=Offset of optical switch The mirror axle 44 is actuated by a spur gear 52 mounted coaxially on the axle 44. The spur gear 52 meshes with a toothed rack 48 which is housed in a linear bearing 54 attached to the spindle assembly 26. The lower end of the rack 48 is attached to a cam follower wheel 50 which runs along the edge of the speed differential ring mechanism 46.

The speed differential ring mechanism 46 is bearinged coaxially with the Yoke 34 and is driven by the speed differential pulley which is connected to a brushless DC motor 60 with a timing belt. The speed differential ring mechanism 46 has a vertical surface which has been machined in a triangular wave pattern. As the ring mechanism 46 rotates, the cam follower wheel 50 tracks the shape of the triangular wave which pushes the rack 48 up and down and drives the spur gear 52 which rotates the mirror in the vertical axis.

The rack bearing assembly is attached to the spindle assembly housing so that the rate of the vertical mirror rotation is a function of the relative difference in rotational speed between the speed differential ring mechanism 46 and the spindle assembly 26.

$$NodRate = 4 \times (YokeRPM - SdrRPM)\left(\frac{1}{60}\right)$$

The amount of vertical travel of the mirror is a function of the gear tooth ratio between the rack 48 and the spur gear 52, and as a function of the amplitude of the triangular wave pattern machined on the speed differential ring mechanism 46.

$$AlphaMechanical = \frac{(57.296 \times Zs)}{Rg}$$

Where:
AlphaMechanical=the change in the mechanical angle of the mirror axle
Zs=The change in position of the rack
Rg=The radius of the Spur Gear The vertical angular position of the mirror is determined by calculating the angular position of the cam follower wheel on the speed differential ring. This is accomplished by using an incremental encoder on the speed differential motor and an optical switch mounted in the scanner ground housing which is activated by a switch pin 72 inserted in the side of the speed differential ring mechanism 46.

Figure 9:
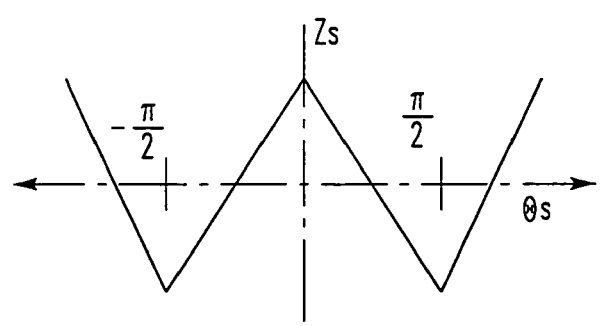
FIG. 9 is a graph associated with the movement of the mirror assembly during operation of the invention.

With reference to FIG. 9, $$Ss = \frac{360}{1000 \times 4 \times GRs}$$

$$\Theta sph = Ns \times Ss$$

$$\Theta cs = \Theta yph - \Theta sph$$

Where:
GRs=Gear Ratio on SDR
Ns=SDR encoder reading in counts
Ss=Degrees/Count
Theta$_{sph}$=Azimuth of SDR
Theta$_{cs}$=Relative Position of SDR to Yoke
If:

$$\Theta cs > \frac{\Pi}{2} \rightarrow \Theta s = \Theta cs - \Pi$$

$$\Theta cs < \frac{\Pi}{2} \rightarrow \Theta s = \Theta cs + \Pi$$

$$Zs = \text{Amplitude} - \frac{4}{\Pi} fabs(\Theta s)$$

Where:
Zs=The change in rack position

An electronic circuit is used to allow a user of the scanning mechanism 20 to specify the horizontal and vertical scan speeds, as is well known in the art. The speed control circuit regulates the speed of each motor 60 and monitors the difference in the speeds so that the resulting scanning motions are very accurate.

A second version of the scanning mechanism 20 uses a single brushless DC motor with two output pulleys to actuate both the spindle assembly 26 and the speed differential ring mechanism 46. This version relies on the gear ratio between the output pulleys to set the vertical scan speed. This version of the scanning mechanism 20 requires less control circuitry and one less motor but does not allow a user to have as much flexibility with speed controls.

A one motor version can be used to create a scanner that has a fixed scan pattern at a given rpm. This is done by belting both the yoke 34 and the speed differential ring mechanism 46 to the same drive motor with different gear ratios.

The scanning mechanism 20 must be balanced in order to allow for proper operation. Specifically, the mirror assembly 36 is balanced so that the center of mass is located at the center of the mirror substrate on the mirror surface. The mirror assembly 36 is also balanced with respect to inertia. As the mirror position changes, the inertia of the scanning mechanism 20 remains constant. This allows the scanning mechanism 20 to be under a constant load even though the system is changing dynamically.

The mirror is also loaded slightly to tip it backwards to keep the cam follower wheel 50 on the speed differential ring mechanism 46. This loading increases as the revolution speed is increased. This enables the scanning mechanism 20 to operate in any orientation and even in environments that have high levels of vibration. The mirror assembly 36 is loaded in two ways. The first is by providing a spring mechanism 56 on the cam mechanism 32. This takes out any backlash in the scanning mechanism 20 and provides a preloading force on the mirror assembly 36. The second way is by moving the center of mass of the mirror assembly 36 to the back by 0.0025". This makes the lower part of the mirror want to hang below the center the mirror axle 44. The force is also a function of scanning speed based on the centrifugal force generated during rotation. Autocad 3-D models are used to balance the scanning mechanism 20. The process is straightforward to one skilled in the art. First all of the components are modeled and assembled. The density of each component is then entered into the system and autocad calculates the center of the mass and inertias. The designer then adjusts the components dimensions and locations to receive the desired balanced and inertia results. The force of the spring mechanism 56 is the main factor that allows the scanning mechanism 20 to operate upside down. However, the loading of the mirror assembly 36 backwards is caused not so much by gravity but by the centrifugal force generated by the motion of the scanning mechanism 20. Therefore, the mirror assembly 36 tries to rotate in the direction that will load the mirror assembly 36 when it spins regardless of orientation. This explains why the scanning mechanism 20 can also operate upside down without a spring mechanism 56 in the scanning mechanism 20.

Figure 1:
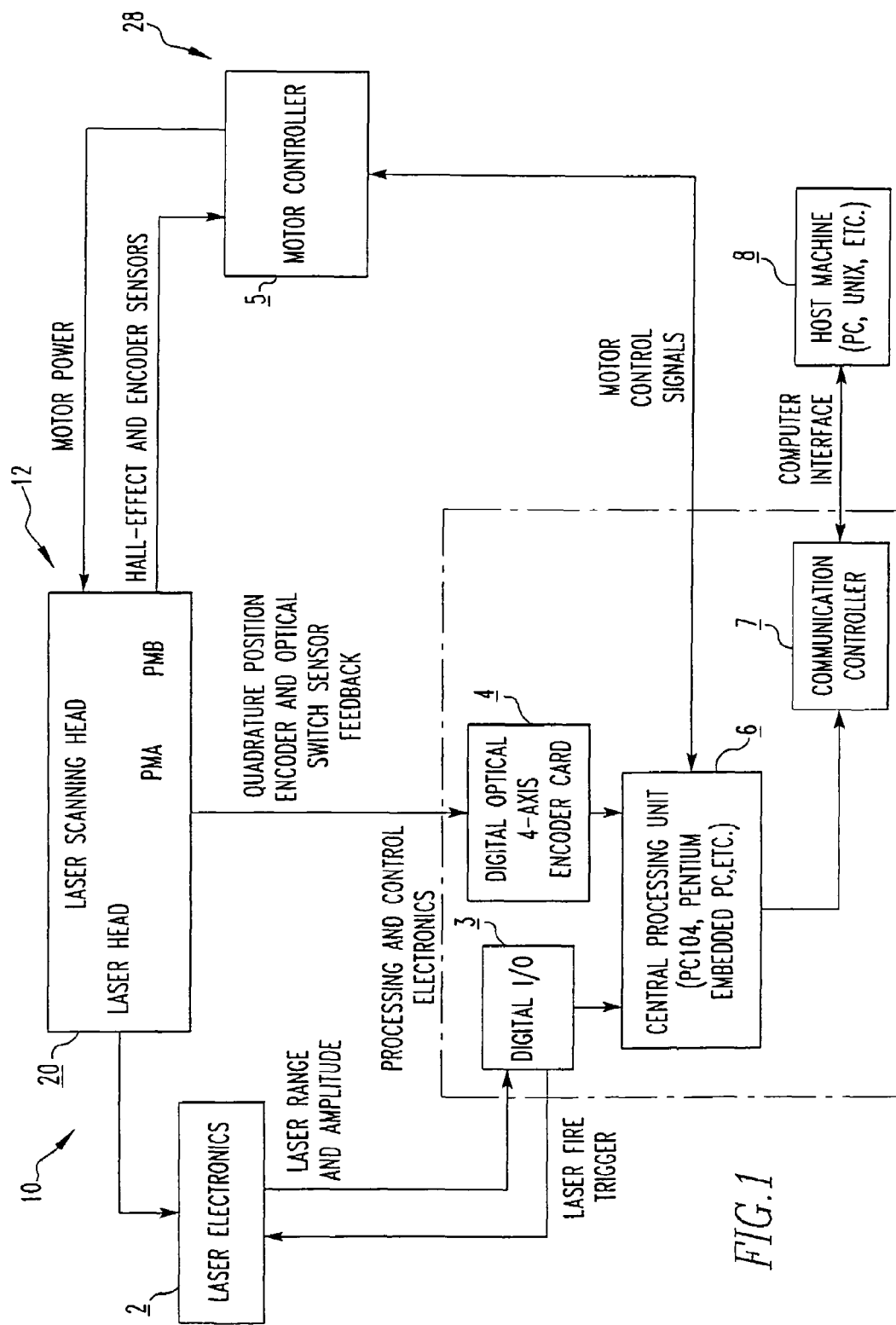
FIG. 1 is a functional block diagram showing the major device components and their interactions of the present invention.

FIG. 1 is a schematic of the physical components and their connection with each other in the scanning mechanism 20. The scanning mechanism 20 contains the energy device and scanning head. There are the laser or energy producing devices' electronics 2, which are well known in the art. There is a digital input/output device 3 for interfacing with the electronics, which is well known in the art. There is an encoder card 4 which allows the encoders to be read which determines the scanning mechanism position. The motor controller 5 regulates the drive mechanism's velocity, position and acceleration based on commands from the CPU, which is well known in the art. The CPU 6 is the main processor of the scanning mechanism 20. The communication controller 7 can be anything from a serial port to a SCSI-2 port or any device for communicating between the device and the host machine. The host machine 8 is where the user enters all commands and views the data.

Figure 2:
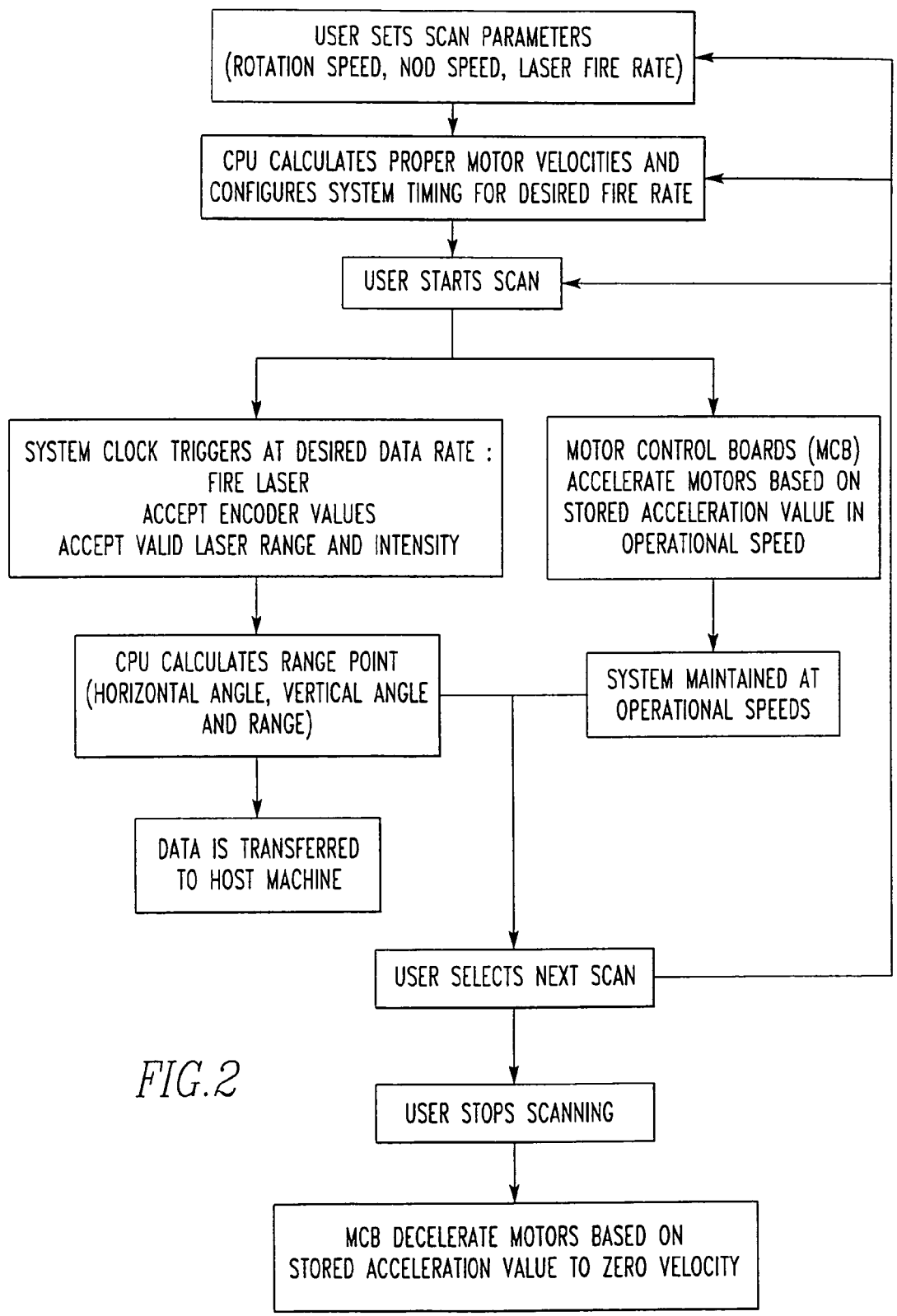
FIG. 2 is a system process flow diagram showing the invention according to its first embodiment.
Figure 3:
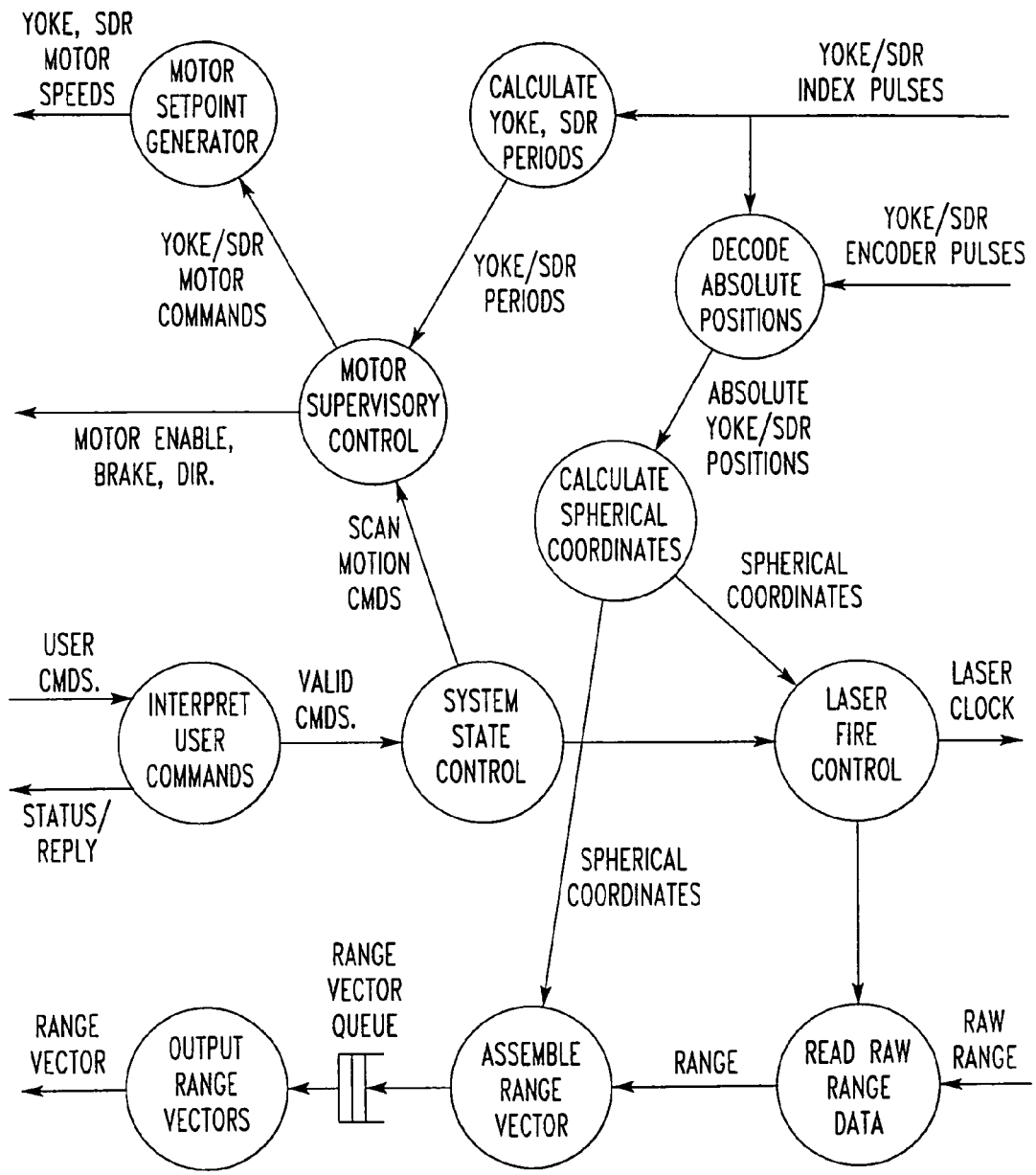
FIG. 3 is a second level system process flow diagram showing the invention according to its first embodiment.

FIG. 2 is a diagram that lays out the general flow diagram of the current user software. FIG. 3 is the detailed control software flow chart, and FIG. 2 is one level higher since it is at the user level.

FIG. 3 is a flow chart showing the interactions of the different software control modules. This demonstrates one possible implementation method for controlling the scanning mechanism 20 and calculating the 3-D data from the raw position feedback signals.

There are three main control levels of the apparatus 10: high level control, motor control, and data control. The high level control handles all of the user interface commands, timing (laser firing), and high level control of the motor and data control modules. The high level control is used for setting up the scanning mechanism 20 based on user inputs, downloading the required motor speeds to the motor control module and setting the fire rate to get the desired data rate. The motor control module is an off the shelf motor controller that regulates the motors acceleration and velocity with respect to the speeds requested by the high level control. The data control module calculates the spherical coordinates based on the scanner physical position and combines this data with the range and amplitude value return by the distance measurement system. All of this data is then passed into a FIFO (First In First Out) where it is sent back to the host machine. The circles are software modules that perform the tasks stated with the circle. The arrows are data paths within the control software of the scanning mechanism. For example, Motor Setpoint Generator; this module simply sets the motor setpoints for velocity, acceleration and position based on the output of the Motor Supervisory control module and sends its information to the motor controllers.

A description of the components of the scanning mechanism 20 now follows:

32. Cam Mechanism (FIG. 5)

50. Cam Follower Wheel—Allows smooth motion of mechanism along the top of the SDR. The wheel follows the curve on the top of the SDR.

56. Spring Mechanism—The spring preloads the mechanism to reduce backlash and the dynamics effects of spinning at high rpm's.

48. Linear Toothed Rack—The rack gear meshes with the spur gear on the mirror axle to turn linear motion into rotary motion.

54. Linear Bearing—The bearing surface for the rack gear.

66. Cam Mount—The mount assembly provides mounting of the cam mechanism components to the Yoke.

Figure 6:
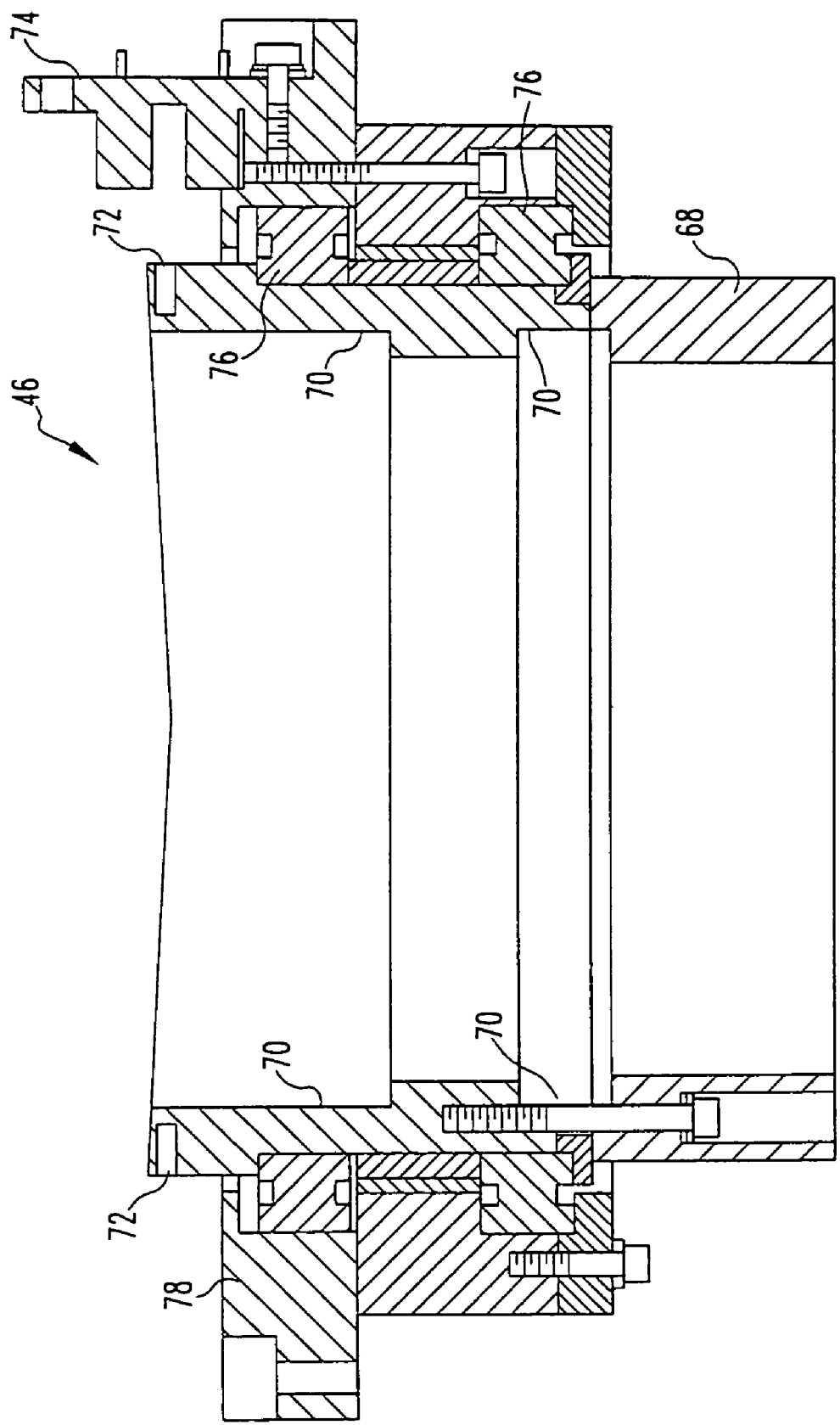
FIG. 6 is a schematic representation of a side cut-away view of the speed differential ring mechanism.

46. Speed Differential Ring (SDR) Mechanism—The SDR provides mounting for the assembly components and the curve that provides the motion for the cam mechanism. (FIG. 6)

68. SDR Pulley—Provides pulley surface for SDR to connect to the drive motor with a timing belt.

70. Bearing Surfaces—Mounting location for the high speed bearings that mount to the Yoke assembly.

72. Pin Mounts—Location of the mechanical pins that activate the optical switches.

62. Optical Switch—Detects pins to determine position of scanning mechanism.

76. Exterior Bearings—Exterior high speed bearings that connect the scanning assembly to housing ground.

78. Mounting for scanning assembly to the housing ground.

24. Yoke Assembly (FIG. 7)

34. Yoke—provides mounting for assembly components and optical bore for energy to travel through mechanism to mirror.

80. Bearings—Yoke high speed bearings that connect assembly to the SDR.

82. Mounting location for the mirror assembly.

84. Yoke Pulley—Provides pulley surface for Yoke to connect to the drive motor with a timing belt.

36. Mirror Assembly (FIG. 8)

64. Counter Weights—Provide balancing of the assembly mass and inertias.

52. Spur gear—The spur gear meshed with the linear rack of the cam mechanism and turns the linear motion of the cam into rotational movement.

44. Mirror Axle—Provides the mounting for the assembly parts and provides alignment for mirror substrate.

86. Mirror Substrate—The aluminum substrate has a gold covered face to provide the mirror surface to reflect the energy beam.

88. Yoke Counterweight—Provides balancing for the cam mechanism mass.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A directing apparatus comprising:
a mechanism for producing steerable energy; and
a mechanism for steering energy from the producing mechanism while the producing mechanism is stationary, said steering mechanism in communication with the producing mechanism, said steering mechanism includes a scanning mechanism which continuously in a first direction scans the volume of a surrounding vertically and horizontally.

2. A directing apparatus as described in claim 1 wherein the mechanism for producing steerable energy includes a mechanism for producing electromagnetic radiation.

3. A directing apparatus as described in claim 2 wherein the scanning mechanism includes a guide mechanism which guides the radiation.

4. A directing apparatus as described in claim 3 wherein the scanning mechanism includes a yoke assembly which holds the guide mechanism.

5. A directing apparatus as described in claim 4 wherein the scanning mechanism includes a spindle assembly upon which the yoke assembly is mounted and which rotates continuously in the first direction.

6. A directing apparatus as described in claim 5 wherein the scanning mechanism includes a controller which regulates the spindle assembly.

7. A directing apparatus as described in claim 6 wherein the scanning mechanism includes an encoder mechanism which measures the angular position of the spindle assembly.

8. A directing apparatus as described in claim 7 wherein the scanning mechanism includes a cam mechanism connected to the guide mechanism and the spindle mechanism which moves the guide mechanism in a second direction perpendicular to the first direction.

9. A directing apparatus as described in claim 8 wherein the guide mechanism includes a mirror assembly, wherein the yoke assembly includes a yoke having a top and a bottom and an optical bore for laser energy to travel through the yoke, said optical bore in alignment with the mirror assembly, said mirror assembly includes an axle which connects the mirror assembly and which is housed at the top of the yoke, and wherein the laser energy producing mechanism is disposed at the bottom of the yoke and in alignment with the optical bore so laser energy from the laser energy producing mechanism can transmit along the optical bore and be reflected by the mirror assembly.

10. A directing apparatus as described in claim 9 wherein the scanning mechanism includes a speed differential ring mechanism bearinged coaxially with the yoke and which rotates, said cam mechanism moves along the speed differential ring mechanism which causes the mirror assembly to rotate in the second direction as a function of the relative difference in rotational speed between the speed differential ring mechanism and the spindle assembly.

11. A directing apparatus as described in claim 10 wherein the speed differential ring mechanism has a vertical surface having a shape of a triangular wave pattern.

12. A directing apparatus as described in claim 11 wherein the cam mechanism is comprised of a cam follower wheel which moves along and tracks the vertical surface of the speed differential ring mechanism, a toothed rack which is attached to the cam follower wheel, and a linear bearing which houses the toothed rack; and wherein the guide mechanism includes a spur gear mounted coaxially on each end of the axle, said spur gear meshes with the toothed rack which actuates the axle to move the mirror assembly in the second direction as a function also of the gear tooth ratio between the toothed rack and the spur gear.

13. A directing apparatus as described in claim 12 wherein the cam mechanism comprises a spring mechanism disposed between and connected with the cam wheel follower and the toothed rack which preloads the mirror assembly to reduce backlash of and maintain the mirror assembly in a stable configuration during rotation.

14. A directing apparatus as described in claim 13 wherein the mirror assembly has a weight distribution which is loaded to tip it backwards to keep the cam wheel follower on the speed differential ring mechanism as the mirror assembly rotates by centrifugal force which is a function of the rotational speed of the mirror assembly.

15. A directing apparatus as described in claim 10 wherein the scanning mechanism has a single motor which drives the yoke and the speed differential ring mechanism with different gear ratios to obtain a fixed scan pattern at a given rpm.

16. A directing apparatus as described in claim 3 wherein the guide mechanism has a nod rate which is adjustable.

17. A directing apparatus as described in claim 16 wherein the guide mechanism has a nod rate which is adjustable from 0.01-8 Hz.

18. A directing apparatus as described in claim 2 wherein the electromagnetic producing mechanism includes a mechanism for producing laser energy.

19. A directing apparatus as described in claim 18 wherein the scanning mechanism includes a sensor mechanism which receives the laser energy back from the surrounding and determines how the surrounding looks from the energy.

20. A directing apparatus as described in claim 19 wherein the scanning mechanism continually scans in the first direction at a speed which is adjustable.

21. A directing apparatus as described in claim 20 wherein the scanning mechanism continually scans in the first direction at a speed which is adjustable between 10-4000 rpm.

22. A directing method comprising the steps of:
producing steerable energy with a steerable energy source;
scanning a volume of a surrounding vertically and horizontally continuously in a first direction with the steerable energy;
receiving the energy back from the surrounding at a sensor mechanism; and
determining how the surrounding looks from the steerable energy received at the sensor mechanism.

23. A method as described in claim 22 wherein the scanning step includes the step of rotating a guide mechanism from a mirror assembly continuously in the first direction, reflecting the energy into the surrounding with the mirror assembly as the mirror assembly rotates, and wherein the receiving step includes the step of receiving the energy back at the mirror assembly from the surrounding, reflecting the energy with the mirror assembly to the sensor mechanism.

24. A method as described in claim 23 wherein the rotating step includes the steps of rotating a spindle assembly in the first direction upon which a yoke assembly that holds the mirror assembly is mounted, and rotating a speed differential mechanism bearinged coaxially with the yoke mechanism and along which a cam mechanism connected to the guide mechanism moves to cause the mirror assembly to rotate in a second direction as a function of the relative difference in rotational speed between the speed differential ring mechanism and the spindle assembly.

* * * * *